(12) United States Patent
Le Faucheur et al.

(10) Patent No.: US 8,724,467 B2
(45) Date of Patent: May 13, 2014

(54) SYSTEM AND METHOD FOR MANAGING CONGESTION IN A NETWORK ENVIRONMENT

(75) Inventors: Francois L. Le Faucheur, Valbonne (FR); Mark Grayson, Maidenhead (GB); Horia M. Miclea, Epalinges (CH)

(73) Assignee: Cisco Technology, Inc., San Jose, CA (US)

( * ) Notice: Subject to any disclaimer, the term of this patent is extended or adjusted under 35 U.S.C. 154(b) by 425 days.

(21) Appl. No.: 13/021,125

(22) Filed: Feb. 4, 2011

(65) Prior Publication Data

US 2012/0201137 A1     Aug. 9, 2012

(51) Int. Cl.
*H04L 12/26* (2006.01)
*H04W 4/00* (2009.01)
*H04W 28/12* (2009.01)

(52) U.S. Cl.
USPC .......... 370/235; 370/236; 370/252; 370/328; 370/338; 370/401; 455/450; 709/223; 709/235

(58) Field of Classification Search
USPC ................ 370/229–234, 235, 252, 328–330
See application file for complete search history.

(56) References Cited

U.S. PATENT DOCUMENTS

| | | | |
|---|---|---|---|
| 6,822,940 B1 * | 11/2004 | Zavalkovsky et al. ........ | 370/237 |
| 6,889,050 B1 * | 5/2005 | Willars et al. .............. | 455/452.2 |
| 7,215,667 B1 | 5/2007 | Davis | |
| 8,000,242 B2 * | 8/2011 | Wang et al. .................. | 370/235 |
| 8,254,382 B1 | 8/2012 | Wu et al. | |
| 8,355,413 B2 * | 1/2013 | Vasamsetti et al. ........... | 370/468 |
| 8,358,593 B2 | 1/2013 | Eipe et al. | |
| 8,391,152 B2 * | 3/2013 | Briscoe et al. ................ | 370/236 |
| 8,493,860 B2 * | 7/2013 | Racz et al. ..................... | 370/235 |
| 2003/0058862 A1 | 3/2003 | Lansing et al. | |
| 2003/0103458 A1 * | 6/2003 | Shin .............................. | 370/230 |
| 2004/0052212 A1 * | 3/2004 | Baillargeon .................. | 370/235 |
| 2005/0041584 A1 * | 2/2005 | Lau et al. ...................... | 370/235 |
| 2005/0138418 A1 | 6/2005 | Spry et al. | |
| 2005/0159167 A1 * | 7/2005 | Hakalin et al. ................ | 455/453 |
| 2006/0159016 A1 * | 7/2006 | Sagfors et al. ................ | 370/230 |
| 2007/0064684 A1 | 3/2007 | Kottilingal | |
| 2007/0105549 A1 | 5/2007 | Suda et al. | |
| 2007/0189268 A1 | 8/2007 | Mitra et al. | |
| 2008/0008093 A1 * | 1/2008 | Wang et al. ................... | 370/235 |
| 2008/0049787 A1 | 2/2008 | McNaughton et al. | |
| 2008/0144496 A1 * | 6/2008 | Bachmutsky .............. | 370/230.1 |

(Continued)

OTHER PUBLICATIONS

U.S. Appl. No. 13/027,970, filed Feb. 15, 2011, entitled "System and Method for Synchronizing Quality of Service in a Wireless Network Environment," Inventors: Mark Grayson, et al.

(Continued)

*Primary Examiner* — Candal Elpenord
(74) *Attorney, Agent, or Firm* — Patent Capital Group (57) ABSTRACT

A method is provided in one example embodiment and includes identifying an Internet protocol (IP) address for a serving gateway; establishing a link between the serving gateway and a congestion notification element; monitoring packets in order to identify whether a differentiated services code point (DSCP) bit has been set in the packets; determining that a threshold associated with congestion in a network has been exceeded; and communicating a signal to the serving gateway associated with the congestion. The serving gateway can be configured to correlate the congestion with identifiers associated with end users operating in the network, where the serving gateway communicates a signal to a network element to reduce the congestion.

18 Claims, 6 Drawing Sheets

(56) References Cited

U.S. PATENT DOCUMENTS

| | | | |
|---|---|---|---|
| 2008/0144502 A1* | 6/2008 | Jackowski et al. | 370/235 |
| 2009/0268684 A1* | 10/2009 | Lott et al. | 370/329 |
| 2009/0296599 A1* | 12/2009 | Ayyagari et al. | 370/253 |
| 2010/0002722 A1 | 1/2010 | Porat et al. | |
| 2010/0246432 A1 | 9/2010 | Zhang et al. | |
| 2010/0322141 A1 | 12/2010 | Liu et al. | |
| 2011/0026453 A1 | 2/2011 | Yan | |
| 2011/0098031 A1 | 4/2011 | Dakshayani et al. | |
| 2011/0098051 A1 | 4/2011 | Kamalaraj et al. | |
| 2011/0110286 A1 | 5/2011 | Lu et al. | |
| 2011/0111767 A1 | 5/2011 | Livanos | |
| 2011/0117931 A1 | 5/2011 | Hu et al. | |
| 2011/0141884 A1 | 6/2011 | Olsson et al. | |
| 2011/0235528 A1* | 9/2011 | Racz et al. | 370/244 |
| 2011/0292870 A1 | 12/2011 | Nagpal et al. | |
| 2012/0026884 A1 | 2/2012 | Sundell et al. | |
| 2012/0047273 A1 | 2/2012 | Ajero et al. | |
| 2012/0269064 A1* | 10/2012 | Strasman | 370/232 |
| 2013/0103833 A1 | 4/2013 | Ringland et al. | |

OTHER PUBLICATIONS

U.S. Appl. No. 13/027,999, filed Feb. 15, 2011, entitled "System and Method for Managing Tracking Area Identity Lists in a Mobile Network Environment," Inventors: Vinod K. Kamalaraj, et al.

U.S. Appl. No. 13/104,788, filed May 10, 2011, entitled "System and Method for Integrated Quality of Service in a Wireless Network Environment," Inventors: Kevin D. Shatzkamer.

U.S. Appl. No. 13/179,537, filed Jul. 10, 2011, entitled "System and Method for Subscriber Mobility in a Cable Network Environment," Inventors: Kevin D. Shatzkamer, et al.

USPTO Mar. 7, 2013 Non-Final Office Action from U.S. Appl. No. 13/027,970.

USPTO Apr. 16, 2013 Response to Non-Final Office Action dated Jan. 24, 2013 from U.S. Appl. No. 13/104,788.

U.S. Appl. No. 13/591,069, filed Aug. 21, 2012, entitled "Providing Integrated End-to-End Architecture That Includes Quality of Service Transport for Tunneled Traffic," Inventors: Mark Grayson, et al.

USPTO Jan. 24, 2013 Non-Final Office Action from U.S. Appl. No. 13/104,788.

O'Dell, Mike, "8+8—An Alternate Addressing Architecture for IPv6," Network Working Group Internet Draft <draft-odell-8+8-00.txt> UUNET Technologies, Oct. 22, 1996, 21 pages.

Subharthi, Paul, et al., "A Vision of the Next Generation Internet: A Policy Oriented Perspective," Proceedings of British Computer Society (BCS) International Conference on Visions of Computer Science, Imperial College, Long, Sep. 22-24, 2008, 12 pages.

Zorn, G., et al., "RADIUS Attributes for Tunnel Protocol Support," Network Working Group RFC 2868, Jun. 2000, 21 pages.

"Data-over-Cable Service Interface Specifications DOCSIS 3.0; MAC and Upper Layer Protocols Interface Specification," Feb. 15, 2008.

P. Eardley, "Pre-Congestion Notification (PCN) Architecture," Network Working Group, RFC 5559, Jun. 2009, 51 pages; http://eprints.eemcs.utwente.nl/15444/01/rfc5559.txt.

Francois Le Faucheur, et al., "RSVP Extensions for Admission Control Over Diffserv Using Pre-Congestion Notification (PCN)," Internet Draft, © The Internet Society (2006), 11 pages; http://tools.ietf.org/pdf/draft-lefaucheur-rsvp-ecn-01.pdf.

Wayne Cutler, "MSF Whitepaper on Quality of Service (QoS) over the Network-to-Network Interface (NNI)—MSF-TR-Services-006. Final," MultiService Forum © 2010, 22 pages.

ETSI, "LTE; General Packet Radio Service (GPRS) enhancements for Evolved Universal Terrestrial Radio Access Network (E-UTRAN) access (3GPP TS 23.401 version 9.6.0 Release 9)," © European Telecommunications Standards Institute 2010; 262 pages.

Kent, et al., "Security Architecture for the Internet Protocol," Network Working Group, IETF RFC 2401; Nov. 1998.

USPTO Jun. 7, 2013 Response to Mar. 7, 2013 Non-Final Office Action from U.S. Appl. No. 13/027,970.

USPTO Jul. 16, 2013 Final Office Action from U.S. Appl. No. 13/027,970.

USPTO Jul. 2, 2013 Non-Final Office Action from U.S. Appl. No. 13/027,999.

USPTO Aug. 2, 2013 Response to Jul. 2, 2013 Non-Final Office Action from U.S. Appl. No. 13/027,999.

USPTO Jun. 7, 2013 Final Office Action from U.S. Appl. No. 13/104,788.

USPTO Jul. 26, 2013 Non-Final Office Action from U.S. Appl. No. 13/179,537.

USPTO Feb. 3, 2014 Non-Final Office Action from U.S. Appl. Ser. No. 13/179,537

U.S. Appl. No. 14/058,732, filed Oct. 21, 2013, entitled "System and Method for Managing Tracking Area Identity Lists in a Mobile Network Environment," Inventors: Vinod K. Kamalaraj, et al.

U.S. Appl. No. 14/159,508 filed Jan. 21, 2014, entitled "System and Method for Managing Congestion in a Network Environment," Inventors: Francois L. LeFaucheur, et al.

USPTO Oct. 31, 2013 Non-Final Office Action from U.S. Appl. No. 13/027,970.

* cited by examiner

SYSTEM AND METHOD FOR MANAGING CONGESTION IN A NETWORK ENVIRONMENT

TECHNICAL FIELD

This disclosure relates in general to the field of communications, and more particularly, to a system and a method for managing congestion in a network environment.

BACKGROUND

Networking architectures have grown increasingly complex in communications environments, particularly mobile wireless environments. Data traffic has grown extensively in recent years, which has significantly increased the demands on radio resources. As the subscriber base of end users increases, efficient management of communication resources becomes even more critical. In some instances, network congestion may cause network equipment to be overwhelmed, provide suboptimal performance, or force call flows to be dropped. Hence, there is a significant challenge in managing network resources, particularly in the context of network congestion.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes identifying an Internet protocol (IP) address for a serving gateway; establishing a link between the serving gateway and a congestion notification element; monitoring packets in order to identify whether a differentiated services code point (DSCP) bit has been set in the packets; determining that a threshold associated with congestion in a network has been exceeded; and communicating a signal to the serving gateway associated with the congestion. The serving gateway can be configured to correlate the congestion with identifiers (e.g., IP addresses, international mobile subscriber identities (IMSIs), etc.) associated with end users operating in the network. The serving gateway can communicate a signal to a network element to reduce the congestion.

In more specific instances, the link is a resource reservation protocol (RSVP) link to be used for propagating the signal. The identifying activity can include recovering IP address information from the packets. Additionally, the monitoring can include evaluating error rates for the packets. The congestion notification element can perform monitoring on a particular type of traffic associated with expedited forwarding (EF) traffic (e.g., ignoring other types of traffic). In more specific instances, a pre-congestion notification (PCN) processing element is configured to aggregate PCN information for individual serving gateways in the network.

Example Embodiments

Figure 1:
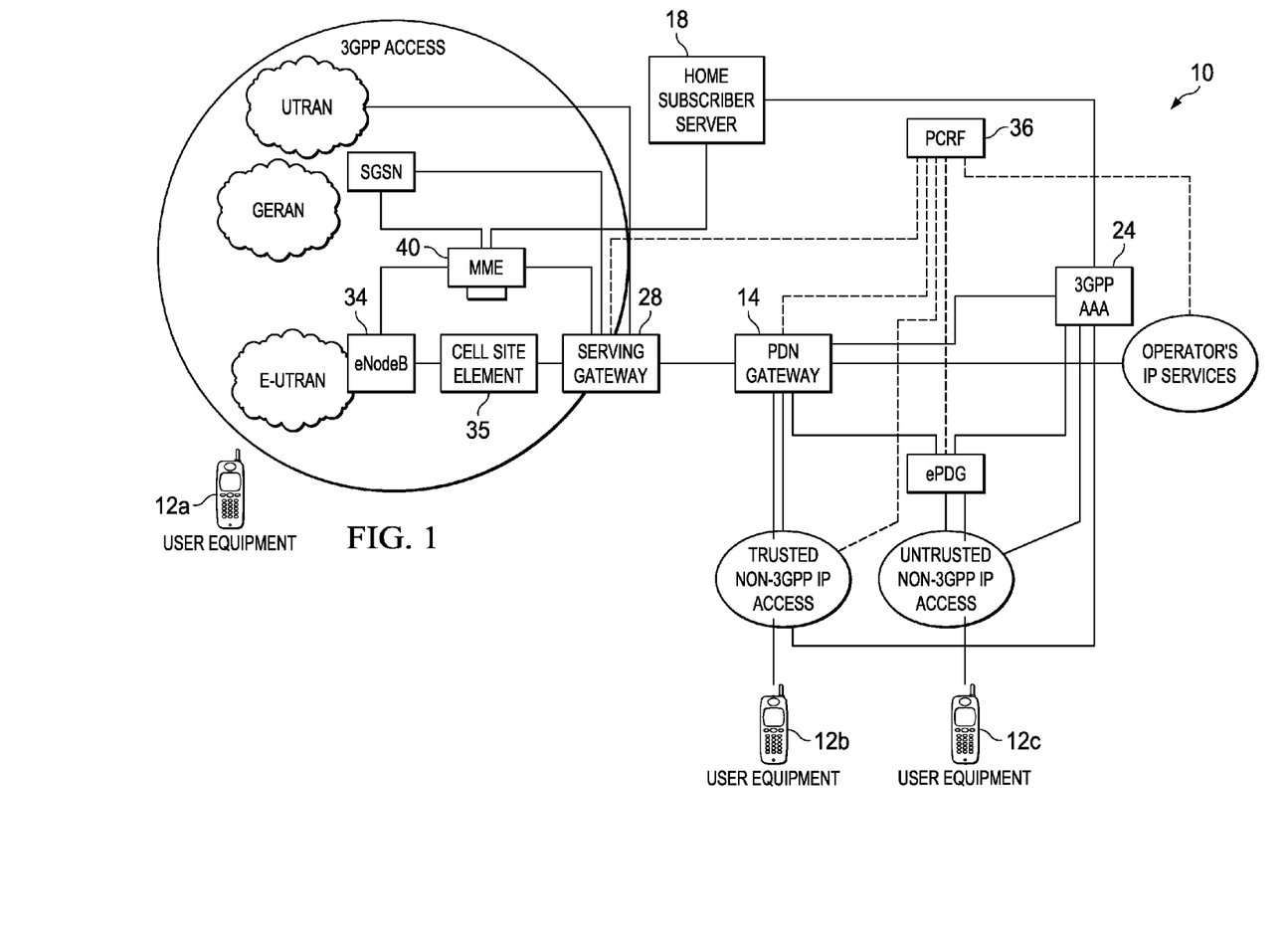
FIG. 1 is a simplified block diagram illustrating a communication system for managing congestion in a network environment according to one embodiment of the present disclosure.

Turning to FIG. 1, FIG. 1 is a simplified block diagram of a communication system 10 for managing congestion in a network environment. This particular configuration may be tied to the 3rd Generation Partnership Project (3GPP) Evolved Packet System (EPS) architecture, also sometimes referred to as the Long-Term Evolution (LTE) EPS architecture, but alternatively this depicted architecture may be applicable to other environments equally. The example architecture of FIG. 1 includes multiple end users operating user equipment (UE) 12a-c and a packet data network (PDN) gateway (PGW) 14, which has a logical connection to a serving gateway (SGW) 28. Also provided is a home subscriber server (HSS) 18 and an Authentication, Authorization, and Accounting (AAA) element 24. SGW 28 has a logical connection to an eNodeB 34, a cell site element 35, and a Mobility Management Entity (MME) 40. Both SGW 28 and PGW 14 can interface with a Policy and Charging Rules Function (PCRF) 36.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. Communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

Also provided in the architecture of FIG. 1 is a series of interfaces, which can offer mobility, policy control, AAA functions, and charging activities for various network elements. For example, interfaces can be used to exchange point of attachment, location, and access data for one or more end users. Resource, accounting, location, access network information, network address translation (NAT) control, etc. can be exchanged using a remote authentication dial in user service (RADIUS) protocol, or any other suitable protocol where appropriate. Other protocols to be used in such communications can include Diameter, service gateway interface (SGI), terminal access controller access-control system (TACACS), TACACS+, etc.

There are two access cases represented in FIG. 1, which depicts these as trusted and untrusted non-3GPP IP access. For the trusted scenario, a viable relationship exists between the service provider and the core network. For the untrusted scenario, a suitable security mechanism can be provided to ensure the integrity of the data communications (e.g., encryption and decryption operations can occur in this scenario and, further, involve an evolved packet data gateway (ePDG), which has a logical connection to PCRF 36 as shown in FIG. 1).

In more general terms, 3GPP defines the Evolved Packet System (EPS) as specified in TS 23.401, TS.23.402, TS 23.203, etc. The EPS generally consists of IP access networks and an Evolved Packet Core (EPC). Access networks may be 3GPP access networks, such a GERAN, UTRAN, and E-UTRAN, or they may be non-3GPP IP access networks such as digital subscriber line (DSL), Cable, WiMAX, code division multiple access (CDMA) 2000, WiFi, or the Internet. Non-3GPP IP access networks can be divided into trusted and untrusted segments. Trusted IP access networks support mobility, policy, and AAA interfaces to the EPC, whereas untrusted networks do not. Instead, access from untrusted networks is done via the ePDG, which provides for IPsec security associations to the user equipment over the untrusted IP access network. The ePDG (in turn) supports mobility, policy, and AAA interfaces to the EPC, similar to the trusted IP access networks.

Before detailing the operations and the infrastructure of FIG. 1, certain contextual information is provided to offer an overview of some problems that may be encountered while managing congestion in a network environment. Such information is offered earnestly and for teaching purposes only and, therefore, should not be construed in any way to limit the broad applications for the present disclosure.

An explicit congestion notification (ECN) can use the IP header to explicitly signal congestion to a downstream element. It is part of the 3GPP architecture and, further, can involve the eNodeB and the UE. Pre-congestion notification (PCN) is a link-specific, load-dependent packet re-marking mechanism. The PCN can provide (e.g., in differentiated services networks) feedback to egress nodes about load conditions within a domain. It can be used to support admission control and flow termination decisions in a simple manner. In a general sense, the PCN is an enhancement to the ECN: providing an indication of pre-congestion levels. Additionally, IP radio access network (RAN) architectures include the ability to transport pseudowire emulation edge to edge (PWE3) for legacy and native IP (e.g., for Iub/IP and S1/IP enabled base stations). Note that the 3GPP architecture has failed to define mechanisms to support dynamic admission control in their latest architecture based on EPS (and more specifically for any access network that supports a combination of 4G and 3G and/or 2G base station traffic).

Current functionalities include the manual partitioning of bandwidth between 2G, 3G, and 4G base stations, where base station management can be based on a percentage of allocated bandwidth. Such schemes are sub-optimal due to several significant deficiencies. For example, such schemes fail to account for a dynamic load between 2G, 3G, and 4G systems. Additionally, such schemes do not allow backhaul resources to be dynamically shared between 2G, 3G, and 4G base stations. Also, such schemes cannot account for dynamic changes in backhaul bandwidth (e.g., due to operating microwave Ethernet links in adverse weather conditions, or operating while a node or a link is failed, when the access network corresponds to a mesh or a partial mesh). Moreover, such schemes require manual provisioning of the base station configuration.

In accordance with one embodiment, communication system 10 can overcome the aforementioned shortcomings (and others) by providing a congestion feedback mechanism that integrates IP RAN and EPC, and which can support enhanced quality of service (QoS)/call admission control (CAC) control. The architecture of the present disclosure is configured to provide a linkage between the IP transport system and the LTE infrastructure (e.g., MME, eNodeB, SGW, etc.). It should be noted that the implementation of communication system 10 is independent of whether wireline and wireless networks are being used (e.g., in a converged IP infrastructure). Hence, the PCN operations are independent of topology. Note also that communication system 10 is configured to evaluate congestion in the IP infrastructure between PCN boundary nodes. The boundary node can be shifted to a PGW and, therefore, can include LTE specific nodes.

In certain instances, communication system 10 can achieve any number of important advantages over existing architectures. For example, the architecture of FIG. 1 is configured to support a dynamic load between 2G, 3G, and 4G systems. Furthermore, the architecture of the present disclosure is configured to allow backhaul resources to be dynamically shared between 2G, 3G, and 4G base stations. Additionally, communication system 10 is configured to account for dynamic changes in backhaul bandwidth, as discussed below. Moreover, there is no requirement of manual provisioning of the base station configuration. Also, the architecture of communication system 10 does not require per-flow network signaling. If appropriate, network signaling effectively operates on an aggregate basis by providing PCN feedback information for an aggregate construct (e.g., on a SGW-base station relationship basis).

In operation, a given IP RAN system can use ECN and/or PCN to signal downstream nodes of congestion status. Subsequently, the initial activity to be performed by the architecture is associated with discovering the serving gateways. The gateways can be identified by signaling messages, IP addresses, or through any suitable mechanisms. Once the serving gateways have been identified, then a reservation resource protocol (RSVP) session can be established between the PCN aggregation element and the serving gateways.

In example embodiments presented herein, a PCN aggregation element (PAE) is defined to perform PCN aggregation on a subset of packet flows. The PAE is a particular instance of a PCN boundary node (e.g., as defined in the IETF PCN architecture). When the PAE is deployed in an LTE environment, the PAE can be configured to aggregate PCN information according to the upstream SGW. When the PAE is deployed in a PWE3 environment, the PAE can aggregate PCN information on a PE basis. Optimally, in the IP RAN deployment, the PAE can be co-located with the PWE3 functionality (e.g., in cell site element 35).

In operation, the PCN architecture can assume that the PCN egress node operates to signal the PCN ingress node if pre-congestion thresholds are crossed. These pre-congestion thresholds can be set on a per-egress link basis, or set using any other appropriate mechanism or parameter. The architecture can set pre-congestion thresholds based on subsets of flows. When the threshold is crossed, the pre-congestion indication can be signaled to points where the decision whether to admit a flow is taken (e.g., an RNC, or an MME depending on use case).

Note that the thresholds can be set according to an aggregate corresponding to the subset of flows, which can be associated with admission control. For example, communication system 10 can use a standard threshold metering such as that which is defined in RFC 5559. In operation, the PAE can be configured to ignore any PCN information associated with a best effort packet, and can therefore perform threshold metering only on traffic of particular interest. In one embodiment, interesting packets may be defined as those marked expedited forwarding (EF).

Semantically, the PCN domain can cover any of the IP RAN transport elements (e.g., between the SGW and PAE for LTE), where the architecture covers cases where the PAE may be in a cell site gateway, or where an eNodeB vendor seeks to augment base station capabilities with a PAE functionality. Hence, the architecture of communication system 10 covers multiple realizations: one where the eNodeB is the PCN boundary, another where the cell site element is the boundary.

The SGW could be a PCN boundary node; alternatively, the router (to which the SGW is connected) can act as a PCN boundary node.

The PAE can be responsible for monitoring aggregated PCN information. The monitoring may preferentially only aggregate information from packets marked as receiving expedited forwarding traffic. In one embodiment, the PAE may be integrated into a router and, further, use the differentiated services code point (DSCP) markings to aggregate only certain flows. This information can be used to identify network elements that experience congestion.

In another embodiment, the PAE is integrated into a base station, and it can use mobile signaling received from a MME to determine which packets correspond to an expedited forwarding (EF) class. In another embodiment, the PAE is integrated into a PWE3-PE cell site element, where it can use virtual circuit (VC) parameters to determine which PWE3 flows are being used to transport voice frames.

Operationally, the PAE is configured to automatically identify an upstream element responsible for sending the traffic which is suffering congestion. The PAE is further operable to feed this aggregated information back into the network, according to different use cases as detailed herein. For example, an RSVP link can be used to signal the serving gateway that congestion is occurring in the network. Because this infrastructure is operating in a closed-loop system, the serving gateway can include intelligence to suitably decrease the rate. For example, the serving gateway may signal a PDN gateway, which may subsequently signal a PCRF element in order to decrease the rate on a per-subscriber basis (or on any other suitable basis). Hence, the architecture has detected congestion for particular users, aggregated that information, and signaled that back to a serving gateway. The serving gateway can address the issue and/or send that information back to a PDN gateway, which is configured to rate-limit the environment based on its own policies (e.g., in an effort to reduce the congestion). Hence, the PGW or the SGW can be used to relieve the detected congestion.

It should also be noted that (with reference to the non-trusted activities), the PAE can be co-located with user equipment 12c and, therefore, be able to offer appropriate feedback to the ePDG, as detailed herein. Additional details relating to the operational capabilities of communication system 10 are provided below. Before turning to those capabilities and additional features, the infrastructure of FIG. 1 is discussed.

Returning to FIG. 1, UE 12a-c can be associated with clients or customers wishing to initiate a flow in communication system 10 via some network. The terms 'user equipment', 'mobile node', 'end user', 'and 'subscriber' are inclusive of devices used to initiate a communication, such as a computer, a personal digital assistant (PDA), a laptop or electronic notebook, a cellular telephone, an i-Phone, i-Pad, a Google Droid phone, an IP phone, or any other device, component, element, or object capable of initiating voice, audio, video, media, or data exchanges within communication system 10. UE 12a-c may also be inclusive of a suitable interface to the human user such as a microphone, a display, a keyboard, or other terminal equipment.

UE 12a-c may also be any device that seeks to initiate a communication on behalf of another entity or element such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. In certain embodiments, UE 12a-c have a bundled subscription for network access and application services (e.g., voice), etc. Once the access session is established, the user can register for application services as well, without additional authentication requirements. There can be two different user data repositories (AAA databases): one for the access user profile and one for the application user profile. IP addresses can be assigned using dynamic host configuration protocol (DHCP), Stateless Address Auto-configuration, default bearer activation, etc., or any suitable variation thereof.

PCRF 36 is a network element responsible for coordinating charging and/or policy decisions for UE 12a-c. PCRF 36 can be configured to use subscription information as a basis for the policy and charging control decisions. The subscription information may apply for both session-based and non-session based services. PCRF 36 can maintain session linking to the sessions via policy interactions with PGW 14 (and possibly SGW 28) and application functions (e.g., provided as part of the operator's IP services). An application function (AF) can be provided within PCRF 36 (or simply interact with PCRF 36) in order to offer applications that require dynamic policy and/or charging control. The AF can communicate with PCRF 36 to transfer dynamic session information. Additionally, any type of policy and/or charging control element (e.g., PCC infrastructure) can be provided within (or suitably interact with) PCRF 36.

HSS 18 offers a subscriber database in 3GPP (e.g., GSM, LTE, etc.) environments. In one sense, HSS 18 can provide functions similar to those offered by an AAA server in a CDMA environment. When a user moves to 3GPP access, HSS 18 can be aware of this location and this anchor point (i.e., PGW 14). Additionally, HSS 18 can communicate with AAA element 24 such that when a UE moves to a CDMA environment, it still has an effective anchor for communications (i.e., PGW 14). HSS 18 and AAA element 24 can coordinate this state information for the UE (and synchronize this information) to achieve mobility. No matter how a UE moves, the access network element can be interacting with either HSS 18 or AAA element 24 in order to identify which PGW should receive the appropriate signaling. The route to a UE can be consistently maintained, where routing topology ensures that data is sent to the correct IP address. Thus, synchronization activity on the backend of the architecture allows mobility to be achieved for the user when operating in different environments. Additionally, in certain examples, PGW 14 performs home agent functions, and the trusted non-3GPP IP access network can provide packet data serving node (PDSN) functions in order to achieve these objectives.

AAA element 24 is a network element responsible for accounting, authorization, and authentication functions for UEs 12a-c. For the AAA considerations, AAA element 24 may provide the mobile node IP address and the accounting session identification (Acct-Session-ID) and other mobile node states in appropriate messaging (e.g., via an access-Request/access-Accept message). An accounting message can be sent for the following events: accounting-start when the IP session is initially created for the mobile node on the gateway; accounting-interim-update when a handover occurred between gateways; and an accounting-stop when the IP session is removed from the gateway serving the element. For roaming scenarios, the home routed case is fully supported by the architecture.

The EPC generally comprises an MME, an SGW, a PGW, and a PCRF. The MME is the primary control element for the EPC. Among other things, the MME provides tracking area list management, idle mode UE tracking, bearer activation and deactivation, SGW and PGW selection for UEs, and authentication services. The SGW is a data plane element that can manage user mobility and interfaces with Radio Access Networks. The SGW also maintains the data paths between eNodeBs and the PGW, and serves as a mobility anchor when UEs move across areas served by different eNodeBs. The PGW provides connectivity for UEs to external packet data networks. The PCRF decides on the charging and the quality of service policies to apply and, further, signals the PGW, which is responsible for detecting service flows and enforcing charging policies.

Radio Access Networks (RANs) in an EPS architecture consist of eNodeBs (also known as eNBs). An eNodeB is generally connected directly to an EPC, as well as to adjacent eNodeBs. Connections with adjacent eNodeBs allow handovers to be coordinated directly between eNodeBs, often with minimal interaction with an EPC. An eNodeB is also responsible for selecting an MME for UEs, managing radio resources, and making handover decisions for UEs.

In operation, UE 12a can attach to the network for purposes of establishing a communication session. UE 12a can communicate with eNodeB 34, which can further interact with MME 40 to complete some form of authentication for a particular user. MME 40 can interact with SGW 28, which interacts with PGW 14 such that a session is being setup between these components. Tunnels could be established at this juncture, and a suitable IP address would also be issued for this particular user. This process generally involves a default EPS bearer being created for UE 12a. As the session is established, PGW 14 can interact with PCRF 36 to identify policies associated with this particular user, such as a certain QoS setting, bandwidth parameter, latency setting, priority, billing, etc.

Figure 2:
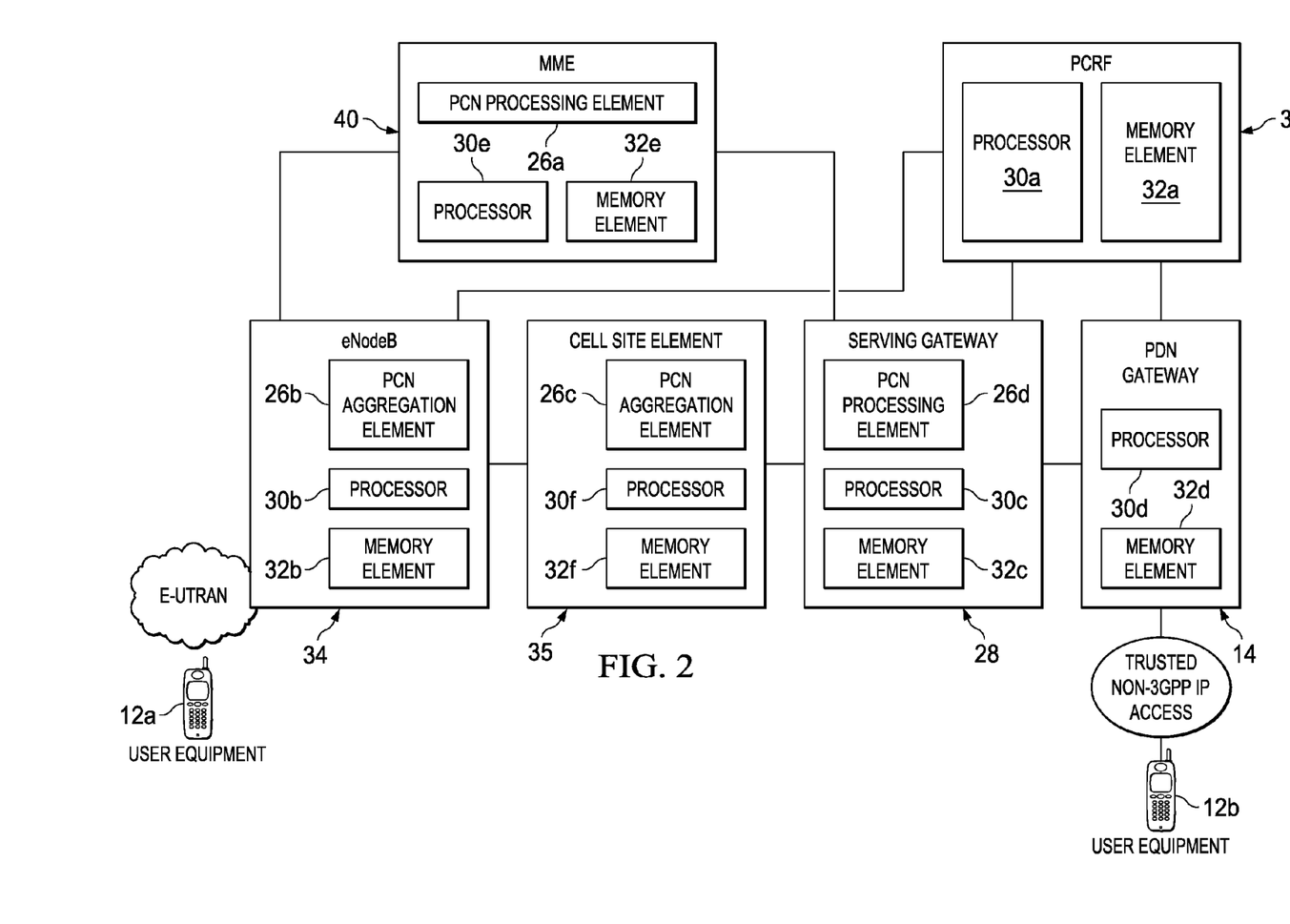
FIG. 2 is a simplified block diagram illustrating additional details associated with one potential embodiment of the communication system.

Turning to FIG. 2, FIG. 2 is a simplified block diagram illustrating additional details associated with one potential embodiment of communication system 10. FIG. 2 includes PGW 14, SGW 28, eNodeB 34, cell site element 35, PCRF 36, and MME 40. Each of these elements includes a respective processor 30a-f and a respective memory element 32a-f. Cell site element 35 and eNodeB 34 each include a respective PCN aggregation element (PAE) 26b-c in this particular example. MME 40, and/or SGW 28 each include a respective PCN processing element (PPE) 26a, 26d in this particular example. Hence, appropriate software and/or hardware is being provisioned in MME 40, SGW 28, cell site element 35, and/or eNodeB 34 in order to facilitate the congestion management activities discussed herein. A single instance of PAE 26b-c may be provisioned in a given network scenario, or multiple instances of this element may be provisioned based on the particular use case. Alternatively, such a mechanism can be provisioned in any of the other elements of FIGS. 1-2. For example, it could be provisioned in the PCN processing element, which may be located in a PWE3 PE router. Such provisioning alternatives may be based on particular operator constraints, particular networking environments, or specific protocol parameters. Note that in certain examples, certain databases can be consolidated with memory elements (or vice versa), or the storage can overlap/exist in any other suitable manner. Also depicted in FIG. 2 is UE 12a-b, where these devices can attach to respective networks in order to conduct their communication sessions.

In one example implementation, PGW 14, SGW 28, eNodeB 34, cell site element 35, and MME 40 are network elements, which are meant to encompass network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In regards to the internal structure associated with communication system 10, each of PGW 14, SGW 28, eNodeB 34, and MME 40 can include memory elements (as shown in FIG. 2) for storing information to be used in achieving the congestion management operations, as outlined herein. Additionally, each of these devices may include a processor that can execute software or an algorithm to perform the congestion management activities discussed herein. These devices may further keep information in any suitable memory element [(e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element.' The information being tracked or sent by PGW 14, SGW 28, eNodeB 34, cell site element 35, and/or MME 40 could be provided in any database, queue, register, control list, or storage structure, all of which can be referenced at any suitable timeframe. Any such storage options may be included within the broad term 'memory element' as used herein. Similarly, any of the potential processing elements, modules, and machines described herein should be construed as being encompassed within the broad term 'processor.' Each of the network elements and user equipment (e.g., mobile nodes) can also include suitable interfaces for receiving, transmitting, and/or otherwise communicating data or information in a network environment.

In one example implementation, eNodeB 34 and/or cell site element 35 include software (e.g., as part of PAEs 26b-c, etc.) to achieve, or to foster, the congestion management operations, as outlined herein. The PAE can be viewed as part of a broader, more generic 'congestion notification element' that can be designed for/tasked with coordinating certain congestion management activities discussed herein. In other embodiments, this congestion management feature may be provided externally to these elements, or included in some other network device to achieve this intended functionality. Alternatively, these elements include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof. Along similar lines, MME 40 and/or SGW 28 include software (e.g., as part of PCN processing elements 26a, 26d to enable the reception of aggregated congestion information).

Note that in certain example implementations, the congestion management functions outlined herein may be implemented by logic encoded in one or more tangible media (e.g., embedded logic provided in an ASIC, in DSP instructions, software [potentially inclusive of object code and source code] to be executed by a processor, or other similar machine, etc.). In some of these instances, memory elements [as shown in FIG. 2] can store data used for the operations described herein. This includes the memory elements being able to store software, logic, code, or processor instructions that are executed to carry out the activities described herein. A processor can execute any type of instructions associated with the data to achieve the operations detailed herein. In one example, the processors [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

Figure 3:
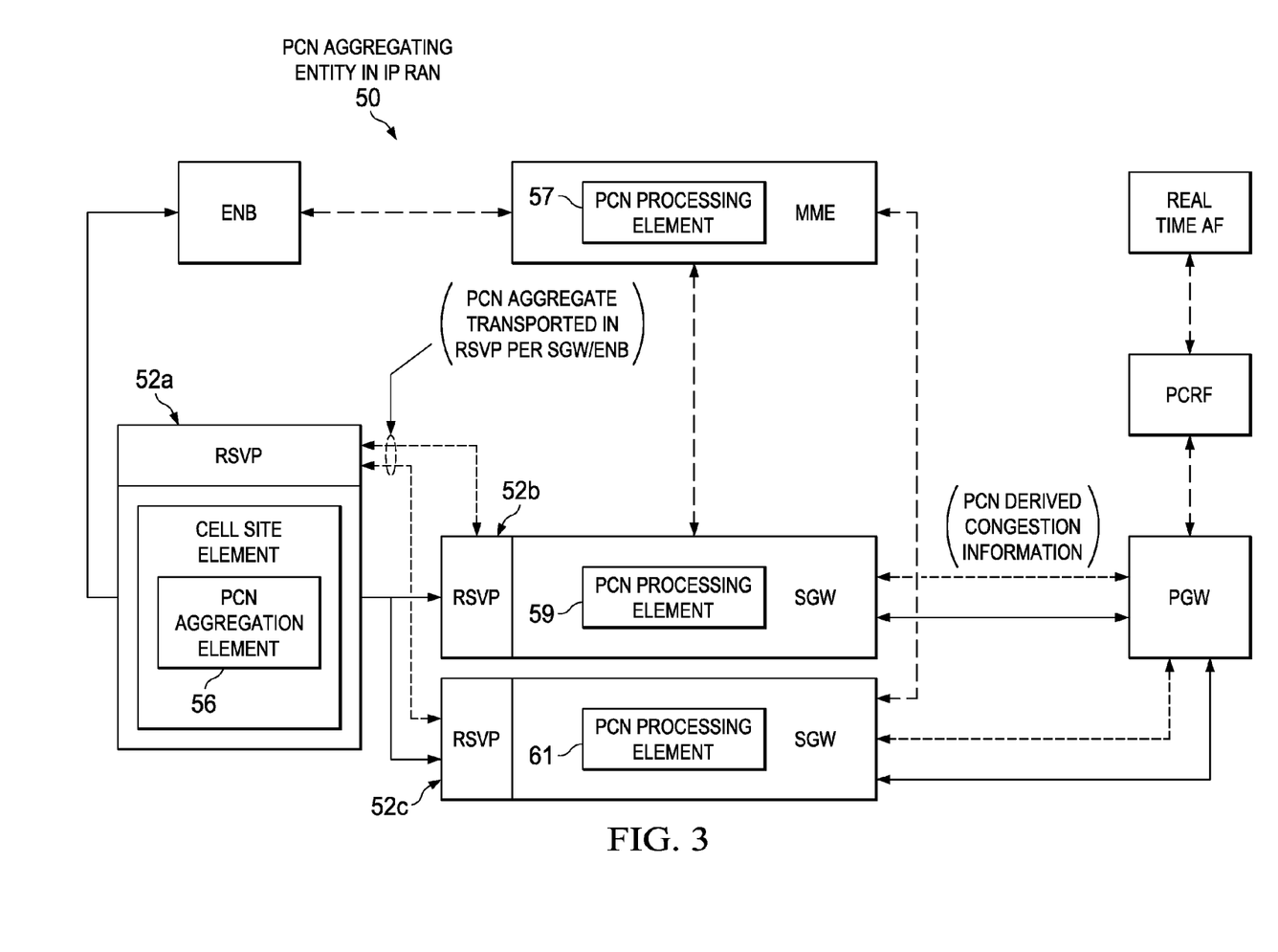
FIGS. 3-6 are simplified block diagrams illustrating details associated with example use cases in particular implementations of the communication system.

Turning to FIG. 3, FIG. 3 is a simplified block diagram illustrating a use case 50 for a PCN aggregating element (PAE) 56 in IP RAN environments. Also included in this illustration are multiple instances of PNC processing elements 57, 59, and 61, which can be provisioned in MMEs, SGWs, etc. In this particular example, PAE 56 is co-located with a cell site element. Additionally, a number of resource reservation protocol (RSVP) elements 52a-c are provisioned in this example arrangement. If PAE 56 is integrated into an element within the IP RAN system, PAE 56 may be enhanced with a functionality to identify the upstream elements based on IP addresses (e.g., to suitably identify an SGW, or identification can be based on a PWE3 analysis).

PAE 56 may be further enhanced to use a control plane to signal congestion status to a PCN processing element (PPE). For example, the PAE/IP RAN element may have a signaling link with each SGW and/or each PWE3-PE back is responsible for sending downlink packets toward the cell site element. The PAE/IP RAN element is then operable to use the signaling channel to indicate its congestion status to appropriate The PPE functions in the upstream elements. In one embodiment, the RSVP link is used as the signaling channel. The signaling information may include any suitable information, such as a percentage of expedited forwarding (EF)/ guaranteed bit rate (GBR)/PW packets for a particular aggregation point that is experiencing congestion.

Figure 4:
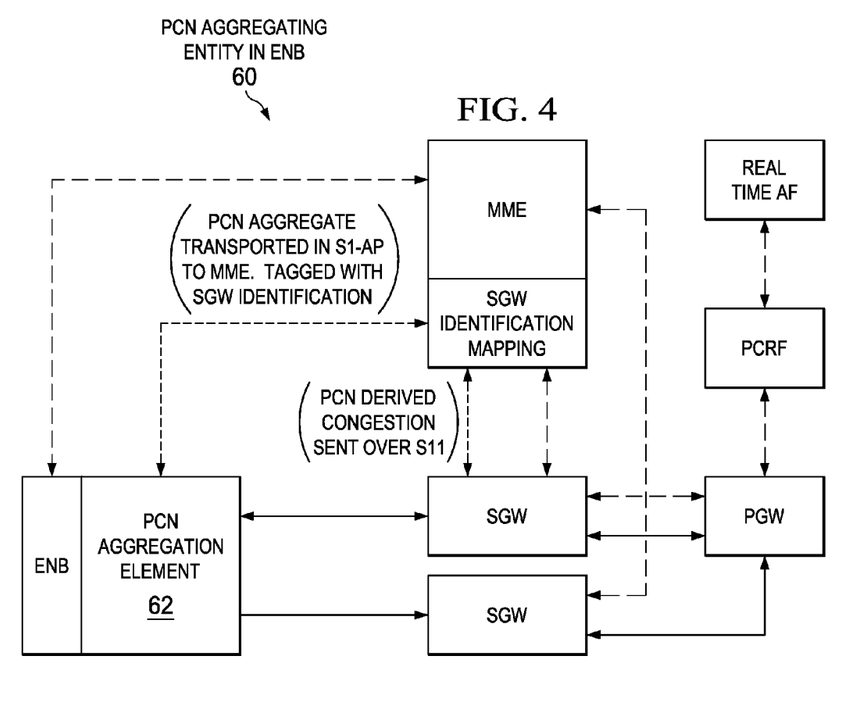

FIG. 4 is a simplified block diagram illustrating a use case 60 for the PCN aggregating entity in eNodeB environments. In this particular example, a PCN aggregation element (PAE) 62 is co-located with an eNodeB. Furthermore, the aggregated congestion status information may be transported in the S1-application protocol (S1-AP) to the MME. The PCN processing element in the MME may consult a database, mapping SGWs to ENBs such that the PCN processing element is able to determine which SGWs are sending traffic (e.g., toward a PAE that has signalled congestion status. The PCN processing element may be further operable to determine which subscribers are sending guaranteed bandwidth flows between the identified SGW and the PAE. Additionally, the PCN derived congestion can be sent over the S11 interface for those identified subscribers.

Hence, if the PAE is integrated into a base station, for example an eNodeB, the PAE may be enhanced with functionality to use the control plane to determine which one or more MMEs is/are responsible for sending traffic toward the eNodeB. The PAE may also enhance an already defined control plane to signal congestion status. For example, the eNodeB may use the S1-AP protocol to signal the congestion status to the MME. In the particular use case, where the PAE is integrated into a 3G base station, the base station may be configured to use high-speed downlink shared channel (HS-DSCH) signaling to provide the RNC with the PCN threshold information. Other types of signaling can readily be employed by the architecture equally.

In cases where the RNC and the SGW are acting independently on the PAE-sourced PCN indication, then both devices can take action to reduce the detected congestion. When both receive an indication that pre-congestion is no longer present, both can independently admit flows. Logistically, as with any feedback technique, operations can be configured to avoid oscillations. The configuration of flows may be based on DSCP markings, or any other suitable indicator. In alternative scenarios, S1-AP signaling could be used to determine whether flows belong to the PCN behavior aggregate.

Note that any MME that receives an indication from a PAE-enabled eNodeB is operable to account for such indications when receiving a request to establish resources towards the eNodeB. The MME may include thresholds at which it may (optimally) signal the corresponding SGW using the S11 interface that previously-committed resources cannot be met. Similarly, any SGW that receives a congestion indication (either directly from a PAE integrated in the IP RAN or via the MME for a PAE in the eNodeB, etc.) may be further operable to include threshold information. The SGW may include information on a per eNodeB basis, and when requests are received to establish resources for an eNodeB, the information may be used to downgrade such a request (or to decline a request). Along similar lines, any RNC receiving a congestion indication (from a PAE-enabled NB) may consider such indications when receiving a request to establish resources toward the NB. The RNC may include thresholds at which it may optimally signal the corresponding serving GPRS support node (SGSN) that previously-committed resources cannot be met.

If an SGW or an SGSN receives an indication that the PCN marking ratio (e.g., for a previously-committed GBR flow) is exceeding a predetermined threshold, then the SGW or the SGSN may be operable to signal the PDN-GW or the GGSN that such is occurring. The PDN-GW/GGSN can pass such an indication to a PCRF or a policy server, which can then determine (e.g., possibly in conjunction with an application server) a remediation action to be performed.

Figure 5:
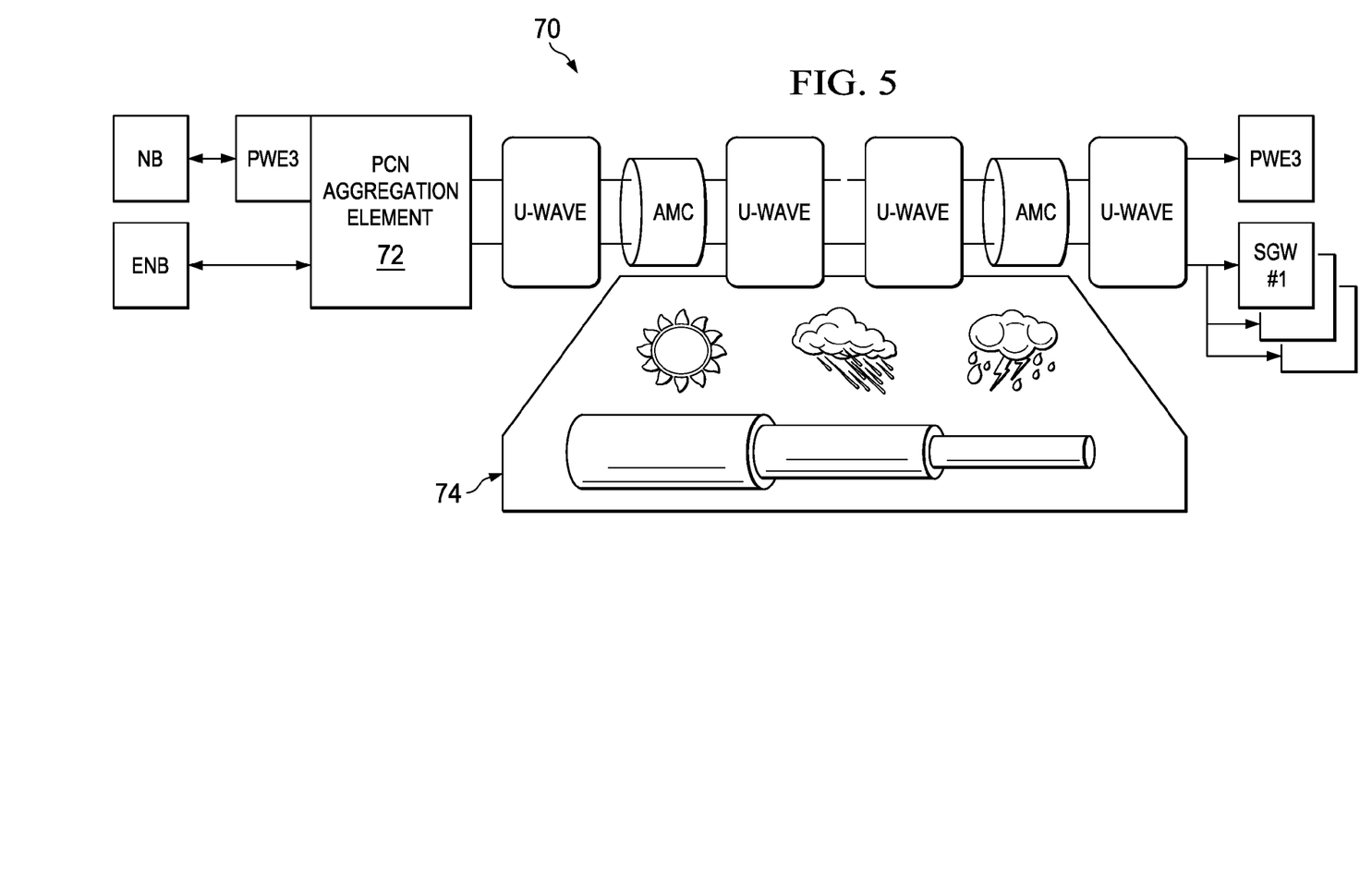

FIG. 5 is a simplified block diagram illustrating a use case 70 for a combination architecture. This illustration could be reflective of, for example, a legacy architecture in conjunction with an LTE configuration. FIG. 5 includes a pseudowire emulation edge to edge (PWE3) device being coupled to a PCN aggregation element 72. FIG. 5 includes a chained microwave system 74 configured for offering dynamic bandwidth according to weather. Additionally, this architecture is operable to perform PCN/ECN marking when congestion status has changed. Further, the arrangement of FIG. 5 can be associated with Ethernet microwave communications having certain modulation features. Hence, there could be native IP traffic propagating through the system, along with pseudowire communications. Assuming microwave Ethernet gear is PCN-enabled, degradation of microwave in adverse weather conditions can trigger the PCN operation, which then (leveraging the described system) allows backpressure to be generated (e.g., toward upstream elements).

Figure 6:
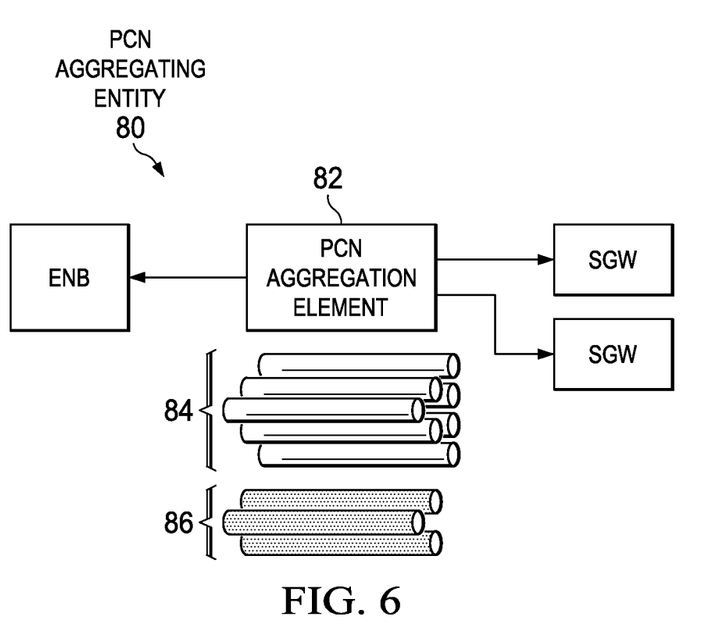

FIG. 6 is a simplified block diagram illustrating a use case 80 in which LTE devices and legacy devices are being implemented in conjunction with a PCN aggregation element 82. More specifically, there are multiple links 84 and 86 that reflect such infrastructure. Links 84 are associated with various non-guaranteed bit rate (GBR) GTP (or PWE3) tunnels, while links 86 are associated with various GBR GTP (or PWE3) tunnels. Note that if the PCN/ECN threshold is crossed, a signal is sent to a corresponding network element to alert the architecture of possible congestion. Hence, the PCN operation can be performed for PCN classified traffic, which can be a GTP/UDP/IP/E packet, a GTP/UDP/IPsec/IP/E packet, a PDCP/RLC/MAC/HS-DSCH FP/UDP/IP/E packet, a PWE3 packet (PDCP/RLC/MAC/HS-DSCH FP/AAL2/ATM/MPLS PW/MPLS PSN/E), etc. The system illustrated in FIG. 6 is configured to record an SGW IP address and a PWE3-PE address; record ECN/PCN information for packets labeled as GBR/EF/PQ; and aggregate information per-SGW and per-PWE3-PE.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures. Additionally, although described with reference to particular scenarios, where a congestion management module (e.g., the PAE and the PPE) is provided within the network elements, these elements can be provided externally, or consolidated and/or combined in any suitable fashion. In certain instances, the PAE may be provided in a single proprietary module, device, unit, etc.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   identifying an Internet protocol (IP) address for each of a plurality of serving gateways;
   establishing a link between the serving gateways and a congestion notification element;
   monitoring packets in order to identify whether a differentiated services code point (DSCP) bit has been set in the packets and to evaluate error rates for the packets;
   aggregating congestion information from the serving gateways based, at least in part, on the monitoring;
   determining, based, at least in part, on the aggregating, that a pre-congestion threshold associated with congestion in a network has been exceeded; and
   communicating, based, at least in part, on the determining, a signal to a particular serving gateway associated with the congestion wherein the serving gateway is configured to correlate the congestion with identifiers associated with end users operating in the network, and wherein the serving gateway communicates another signal to another network element to reduce the congestion.

2. The method of claim 1, wherein the link is a resource reservation protocol (RSVP) link to be used for propagating the signal.

3. The method of claim 1, wherein aggregated congestion status information is transported in an S1-application protocol (S1-AP) to a Mobility Management Entity (MME).

4. The method of claim 1, wherein the identifying includes recovering IP address information from the packets, and wherein the signal identifies a subnet in the network.

5. The method of claim 1, wherein the congestion notification element performs monitoring on a particular type of traffic associated with expedited forwarding (EF) traffic.

6. The method of claim 1, wherein a pre-congestion notification (PCN) processing element is configured to aggregate PCN information for individual serving gateways in the network.

7. A Logic encoded in non-transitory media that includes code for execution and when executed by a processor operable to perform operations comprising:
   identifying an Internet protocol (IP) address for each of a plurality of serving gateways;
   establishing a link between the serving gateways and a congestion notification element;
   monitoring packets in order to identify whether a differentiated services code point (DSCP) bit has been set in the packets and to evaluate error rates for the packets;
   aggregating congestion information from the serving gateways based, at least in part, on the monitoring;
   determining, based, at least in part, on the aggregating, that a pre-congestion threshold associated with congestion in a network has been exceeded; and
   communicating, based, at least in part, on the determining, a signal to a particular serving gateway associated with the congestion, wherein the serving gateway is configured to correlate the congestion with identifiers associated with end users operating in the network, and wherein the serving gateway communicates another signal to another network element to reduce the congestion.

8. The logic of claim 7, wherein the link is a resource reservation protocol (RSVP) link to be used for propagating the signal.

9. The logic of claim 7, wherein aggregated congestion status information is transported in an S1-application protocol (S1-AP) to a Mobility Management Entity (MME).

10. The logic of claim 7, wherein the identifying includes recovering IP address information from the packets, and wherein the signal identifies a subnet in the network.

11. The logic of claim 7, wherein the congestion notification element performs monitoring on a particular type of traffic associated with expedited forwarding (EF) traffic.

12. The logic of claim 7, wherein a pre-congestion notification (PCN) processing element is configured to aggregate PCN information for individual serving gateways in the network.

13. An apparatus, comprising:
a memory element configured to store electronic code;
a processor operable to execute instructions associated with the electronic code; and
a congestion notification element configured to interface with the processor such that the apparatus is configured for:
identifying an Internet protocol (IP) address for each of a plurality of serving gateways;
establishing a link between the serving gateways and a congestion notification element;
monitoring packets in order to identify whether a differentiated services code point (DSCP) bit has been set in the packets and to evaluate error rates for the packets;
aggregating congestion information from the serving gateways based, at least in part, on the monitoring;
determining, based, at least in part, on the aggregating, that a pre-congestion threshold associated with congestion in a network has been exceeded; and
communicating, based, at least in part, on the determining, a signal to a particular serving gateway associated with the congestion, wherein the serving gateway is configured to correlate the congestion with identifiers associated with end users operating in the network, and wherein the serving gateway communicates another signal to another network element to reduce the congestion.

14. The apparatus of claim 13, wherein the link is a resource reservation protocol (RSVP) link to be used for propagating the signal.

15. The apparatus of claim 13, wherein aggregated congestion status information is transported in an S1-application protocol (S1-AP) to a Mobility Management Entity (MME).

16. The apparatus of claim 13, wherein the identifying includes recovering IP address information from the packets, and wherein the signal identifies a subnet in the network.

17. The apparatus of claim 13, wherein the congestion notification element performs monitoring on a particular type of traffic associated with expedited forwarding (EF) traffic.

18. The apparatus of claim 13, wherein a pre-congestion notification (PCN) processing element is configured to aggregate PCN information for individual serving gateways in the network.

* * * * *